United States Patent
List et al.

(10) Patent No.: US 11,840,351 B2
(45) Date of Patent: Dec. 12, 2023

(54) AIRCRAFT FOR SELF-NEUTRALIZING FLIGHT

(71) Applicant: BETA AIR, LLC, South Burlington, VT (US)

(72) Inventors: Alexander Hoekje List, South Burlington, VT (US); David L Churchill, Winooski, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/222,539

(22) Filed: Apr. 5, 2021

(65) Prior Publication Data

US 2022/0315236 A1 Oct. 6, 2022

(51) Int. Cl.
   *B64D 31/10* (2006.01)
   *B64D 27/24* (2006.01)
   *B64C 29/00* (2006.01)
   *B64D 31/12* (2006.01)

(52) U.S. Cl.
   CPC .......... *B64D 31/10* (2013.01); *B64C 29/0033* (2013.01); *B64D 27/24* (2013.01); *B64D 31/12* (2013.01)

(58) Field of Classification Search
   CPC ......... B64C 11/46; B64C 27/08; B64C 27/52; B64C 29/0033; B64C 2201/042; B64D 27/24; B64D 31/10; B64D 31/12; B64D 2045/0085; G05D 1/0072; B64U 30/297
   See application file for complete search history.

(56) References Cited

U.S. PATENT DOCUMENTS

| 7,032,860 | B1 | 4/2006 | Kirk | |
|---|---|---|---|---|
| 8,032,269 | B2 | 10/2011 | Cherepinsky | |
| 8,128,033 | B2 | 3/2012 | Raposo | |
| 8,523,102 | B2 | 9/2013 | Shue | |
| 9,540,100 | B2 | 1/2017 | Dekel | |
| 9,618,939 | B2 | 4/2017 | Wolf | |
| 9,663,236 | B1 * | 5/2017 | Shiosaki | B64C 11/20 |
| 9,764,829 | B1 * | 9/2017 | Beckman | B64C 27/22 |

(Continued)

FOREIGN PATENT DOCUMENTS

| CN | 105539834 A | * | 5/2016 |
|---|---|---|---|
| CN | 109407692 A | * | 3/2019 |

(Continued)

OTHER PUBLICATIONS

Gasco, Pau Segui, "Development of a dual-axis tilt rotorcraft UAV", Cranfield University Master of Science thesis, 2012, 181 pages (Year: 2012).*

(Continued)

*Primary Examiner* — David A Testardi
(74) *Attorney, Agent, or Firm* — CALDWELL INTELLECTUAL PROPERTY LAW

(57) ABSTRACT

An aircraft for self-neutralizing flight comprising a fuselage, at least a power source, a plurality of laterally extending elements attached to the fuselage, a plurality of downward directed propulsors attached to the plurality of laterally extending elements and electrically connected to at least a power source, wherein the plurality of downward directed propulsors have a rotational axis offset from a vertical axis by a yaw-torque-cancellation angle.

19 Claims, 6 Drawing Sheets

(56) References Cited

U.S. PATENT DOCUMENTS

| | | | |
|---|---|---|---|
| 9,856,016 B2 | 1/2018 | Mueller | |
| 9,908,616 B1* | 3/2018 | Horn | B64C 29/0033 |
| 10,005,550 B2 | 6/2018 | Toulmay | |
| 10,081,436 B1* | 9/2018 | Tian | B64C 39/12 |
| 10,220,953 B2 | 3/2019 | Ishii | |
| 10,232,950 B2 | 3/2019 | McCullough | |
| 10,322,824 B1* | 6/2019 | Demont | B60L 3/0061 |
| 10,518,875 B2* | 12/2019 | Judas | B64C 29/0025 |
| 10,604,236 B2 | 3/2020 | Venkataraman | |
| 11,065,979 B1* | 7/2021 | Demont | H01M 10/482 |
| 11,643,219 B1* | 5/2023 | Szmuk | B64C 29/0033 |
| 2003/0080242 A1* | 5/2003 | Kawai | F02K 3/025 |
| | | | 244/12.4 |
| 2006/0226281 A1* | 10/2006 | Walton | B64C 29/0033 |
| | | | 244/17.23 |
| 2010/0301168 A1* | 12/2010 | Raposo | A63H 23/00 |
| | | | 244/171.2 |
| 2012/0261523 A1* | 10/2012 | Shaw | B64C 27/28 |
| | | | 244/7 R |
| 2016/0023755 A1* | 1/2016 | Elshafei | G08G 5/025 |
| | | | 244/17.13 |
| 2016/0122018 A1* | 5/2016 | Matsue | G05D 1/0858 |
| | | | 244/17.13 |
| 2016/0207625 A1* | 7/2016 | Judas | B64C 29/0025 |
| 2016/0347447 A1* | 12/2016 | Judas | B64C 39/024 |
| 2017/0015412 A1* | 1/2017 | Matus | G05D 1/0808 |
| 2017/0121034 A1* | 5/2017 | Fisher | H04N 5/23267 |
| 2017/0190435 A1* | 7/2017 | Kobayashi | H02P 29/10 |
| 2017/0217584 A1* | 8/2017 | Elfeky | G05D 1/0858 |
| 2017/0274991 A1* | 9/2017 | Shiosaki | B64C 11/46 |
| 2017/0300065 A1* | 10/2017 | Douglas | B64C 29/0025 |
| 2018/0002003 A1* | 1/2018 | Won | B64C 27/26 |
| 2018/0072430 A1* | 3/2018 | Misfeldt | B64D 31/06 |
| 2018/0105266 A1* | 4/2018 | Lee | B64C 27/52 |
| 2018/0105267 A1* | 4/2018 | Tighe | B64C 27/52 |
| 2018/0105279 A1* | 4/2018 | Tighe | B64D 27/24 |
| 2018/0145377 A1* | 5/2018 | Zheng | H01M 50/572 |
| 2018/0148169 A1* | 5/2018 | Zhang | B64C 39/024 |
| 2018/0208295 A1* | 7/2018 | Mores | B64C 27/20 |
| 2018/0208296 A1* | 7/2018 | Mores | B64C 27/08 |
| 2018/0229833 A1* | 8/2018 | Kimchi | B64C 25/26 |
| 2018/0370629 A1* | 12/2018 | Finlay | B64C 29/0033 |
| 2019/0009899 A1* | 1/2019 | Tian | G05D 1/0858 |
| 2019/0047693 A1* | 2/2019 | Katayama | B64C 29/0033 |
| 2019/0061973 A1* | 2/2019 | Cutler | B64F 5/60 |
| 2019/0077498 A1* | 3/2019 | Yu | B64D 31/06 |
| 2019/0135424 A1* | 5/2019 | Baity | B64C 29/0033 |
| 2019/0225332 A1* | 7/2019 | Burns | B64C 39/024 |
| 2019/0256191 A1* | 8/2019 | Suzuki | B64C 27/08 |
| 2019/0291883 A1* | 9/2019 | Atamanov | B64U 10/13 |
| 2019/0329882 A1* | 10/2019 | Baity | B64C 29/0033 |
| 2019/0337634 A1 | 11/2019 | Geiger | |
| 2020/0062386 A1* | 2/2020 | Zhang | B63B 35/00 |
| 2020/0079501 A1* | 3/2020 | Graves | B64C 9/00 |
| 2020/0079520 A1* | 3/2020 | Demizu | H02J 7/007182 |
| 2020/0089227 A1* | 3/2020 | LeGrand | B64C 11/46 |
| 2020/0103922 A1 | 4/2020 | Nonami | |
| 2020/0122832 A1* | 4/2020 | Morris | B64C 27/52 |
| 2020/0283134 A1* | 9/2020 | Mores | B64C 27/10 |
| 2020/0393851 A1* | 12/2020 | Kim | B64C 29/0033 |
| 2021/0053675 A1* | 2/2021 | Agronov | B64C 27/52 |
| 2021/0107640 A1* | 4/2021 | Baity | B64C 29/0033 |
| 2021/0197965 A1* | 7/2021 | Kunz | B64C 39/024 |
| 2021/0253234 A1* | 8/2021 | Tao | B64C 29/0025 |
| 2021/0362849 A1* | 11/2021 | Bower | B64C 27/28 |
| 2022/0043465 A1* | 2/2022 | Vander Mey | B64C 27/021 |
| 2022/0126998 A1* | 4/2022 | Jung | B64D 31/10 |
| 2022/0169375 A1* | 6/2022 | Ouellet | B64C 27/78 |
| 2022/0169376 A1* | 6/2022 | Dugré | B64C 27/82 |
| 2022/0169398 A1* | 6/2022 | Ouellet | B64D 27/24 |
| 2022/0171409 A1* | 6/2022 | Ouellet | G05D 1/0808 |
| 2022/0250742 A1* | 8/2022 | Bower | B64C 27/28 |
| 2022/0281599 A1* | 9/2022 | Tian | G05D 1/0808 |
| 2022/0315207 A1* | 10/2022 | List | B64C 27/52 |
| 2022/0315214 A1* | 10/2022 | Mitani | B60L 50/66 |
| 2022/0315237 A1* | 10/2022 | Fukuchi | B64D 27/24 |
| 2022/0402602 A1* | 12/2022 | Moy | B64C 29/0091 |
| 2022/0411089 A1* | 12/2022 | Moy | B64D 27/24 |
| 2023/0006598 A1* | 1/2023 | Kawadu | B60R 16/0232 |

FOREIGN PATENT DOCUMENTS

| | | | |
|---|---|---|---|
| CN | 112537444 A | * 3/2021 | |
| JP | 2016032971 A | * 3/2016 | |
| WO | WO-2020217117 A1 | * 10/2020 | B64C 29/0025 |

OTHER PUBLICATIONS

Efraim, Hanoch et al., Quadrotor with a dihedral angle: on the effects of tilting the rotors inwards, Journal of Intelligent & Robotic Systems, J Intell Robot Syst (2015), vol. 80, pp. 313-324 (Year: 2015).*

Elfeky, Mahmoud et al., "Modeling and simulation of quadrotor UAV with tilting rotors", International Journal of Control, Automation and Systems, vol. 14 No. 4, 2016, pp. 1047-1055 (Year: 2016).*

EPO machine translation of JP 2016-032971 (original JP document published Mar. 10, 2016) (Year: 2016).*

Miwa, Masafumi et al., "Arbitrary attitude hovering control of quad tilt rotor helicopter", Journal of Robotics and Mechatronics, vol. 28 No. 3, 2016, pp. 328 to 333 (Year: 2016).*

Nemati, Alireza et al., "Stability and control of tilting-rotor quadcopter in case of a propeller failure", Proceedings of the ASME Dynamic Systems and Control Division, DSSC 2016, Oct. 12-14, 2016, Minnesota, USA, 8 pages (Year: 2016).*

Von Klemperer, Nicholas, "Dual axis tilting quadrotor aircraft", University of cape Town Master of Science dissertation, Oct. 2018 (apparently published May 16, 2019), 201 pages (Year: 2019).*

EPO machine translation of CN 109407692 A (original CN document published Mar. 1, 2019) (Year: 2019).*

Speas, Rebecca Barnett, "The functional application of the propeller load curve for fixed pitch propellers", Masters Thesis, University of Tennessee, Knoxville, Dec. 2006, 50 pages (Year: 2006).*

Scott, Jeff, "Propeller torque effect", Aerospaceweb.org Ask a Rocket Scientist, Feb. 25, 2001, 3 pages, downloaded from https://aerospaceweb.org/question/dynamics/q0015a.shtml (Year: 2001).* https://arc.aiaa.org/doi/abs/10.2514/1.59869?journalCode=jgcd Title: Flight Control of a Quadrotor Vehicle Subsequent to a Rotor Failure, (abstract only) Date: Feb. 21, 2014 by: Alexander Lanzon, Alessandro Fendi.

* cited by examiner

US 11,840,351 B2

AIRCRAFT FOR SELF-NEUTRALIZING FLIGHT

FIELD OF THE INVENTION

The present invention generally relates to the field of electrically propelled vehicles. In particular, the present invention is directed to an aircraft for self-neutralizing flight.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect an aircraft for self-neutralizing flight includes a fuselage, at least a power source, a plurality of laterally extending elements attached to the fuselage, a plurality of downward directed propulsors attached to the plurality of laterally extending elements and electrically connected to the at least a power source, wherein the plurality of downward directed propulsors have a rotational axis offset from a vertical axis by a yaw-torque-cancellation angle.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft for self-neutralizing flight. In an embodiment, this disclosure detects a failure event of a flight component in an aircraft. Aspects of the present disclosure can be used to determine a corrective action for the flight components of the plurality of flight components to generate a corrective action. Aspects of the present disclosure allow for commanding the plurality of flight components to perform the corrective action. Exemplary embodiments illustrating aspects of the present disclosure are described below in the context of several specific examples.

Figure 1:
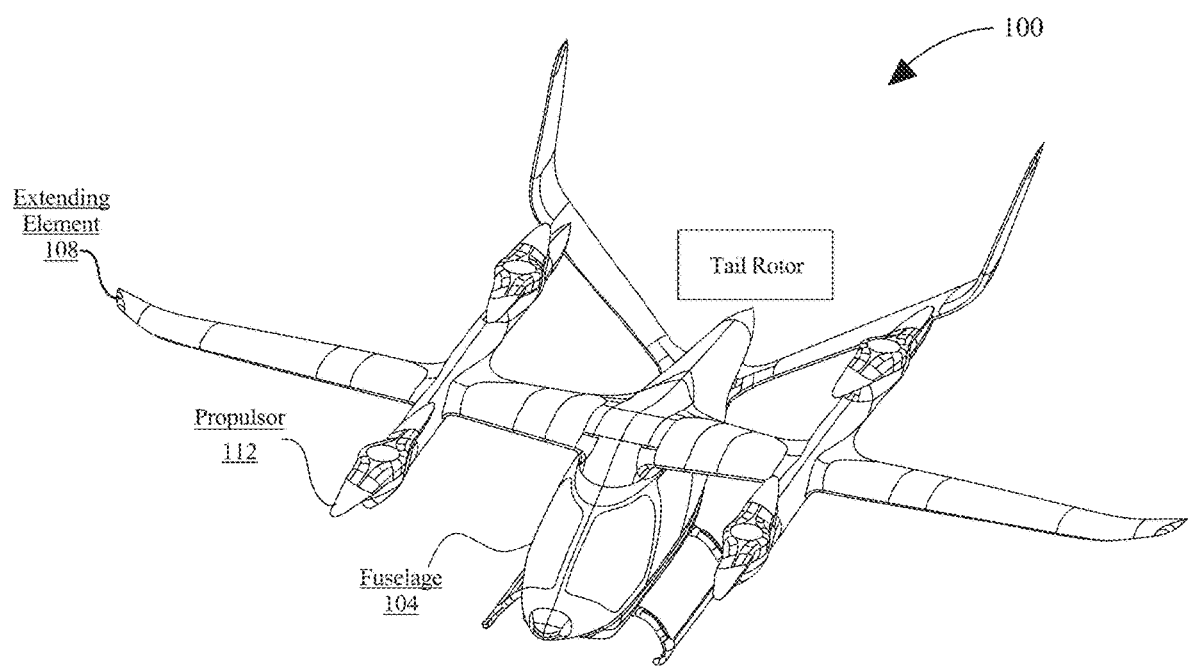
FIG. 1 is a diagrammatic representation of an exemplary embodiment of an electric aircraft.

Referring now to FIG. 1, an exemplary embodiment of an aircraft 100 for self-neutralizing flight is illustrated. System 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 1, an illustration of forces is illustrated in an electric aircraft. During flight, a number of forces may act upon the electric aircraft. Forces acting on an aircraft during flight may include thrust, the forward force produced by the rotating element of the aircraft and acts parallel to the longitudinal axis. Drag may be defined as a rearward retarding force which is caused by disruption of airflow by any protruding surface of the aircraft such as, without limitation, the wing, rotor, and fuselage. Drag may oppose thrust and acts rearward parallel to the relative wind. Another force acting on aircraft may include weight, which may include a combined load of the aircraft itself, crew, baggage and fuel. Weight may pull aircraft downward due to the force of gravity. An additional force acting on aircraft may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Still referring to FIG. 1, aircraft 100 includes a fuselage 104. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, aircraft fuselage 104 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of aircraft fuselage 104 orthogonal to the longitudinal (nose to tail) axis of the aircraft and forms the general shape of fuselage 104. A former may comprise differing cross-sectional shapes at differing locations along fuselage 104, as the former is the structural element that informs the overall shape of a fuselage 104 curvature. In embodiments, aircraft skin can be anchored to formers and strings such that the outer mold line of the volume encapsulated by the formers and stringers comprises the same shape as aircraft 100 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 1, fuselage 104 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 104 can include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 1, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 104. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 includes at least a power source located within fuselage 104. As used in this disclosure a "power source" is a source that may propel a rotor, or set of airfoils, through a fluid medium, like air, generating lift. Power source may include a motor A motor may include without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and/or dynamic braking.

In an embodiment, and still referring to FIG. 1, power source may include an energy source. As used in this disclosure an "energy source" is a device that is capable of providing energy to the plurality of power sources. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand.

High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, aircraft 100 includes a plurality of laterally extending elements 108 attached to fuselage 104. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element 108 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 includes a plurality of downward directed propulsors 112 attached to the plurality of extending elements 108 and electrically connected to the at least power source. As used in this disclosure a "propulsor" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight. As used in this disclosure, "attached" means that at least a portion of a device, component, or circuit is connected to at least a portion of the aircraft via a mechanical coupling and/or attachment and/or fastening component and/or mechanism. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly by gaining support from the air. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

In an embodiment, and still referring to FIG. 1, downward directed propulsor 112 has a rotational axis offset from a vertical axis. As used in this disclosure a "rotational axis" is circular movement of a propeller about a vertical axis. For example, a propeller may revolve around a shaft, wherein the shaft is oriented along the vertical axis. In an embodiment a propeller may convert rotary motion from an engine or other power source into a swirling slipstream which pushes the propeller forwards or backwards. Propulsor may include a rotating power-driven hub, to which are attached several radial airfoil-section blades such that the whole assembly rotates about a longitudinal axis. As a non-limiting example. the blade pitch of the propellers may be fixed, manually variable to a few set positions, automatically variable (e.g. a "constant-speed" type), and/or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. Additionally or alternatively, downward directed propulsor has a rotational axis offset from a vertical axis by a yaw-torque-cancellation angle. As used in this disclosure a "yaw-torque-cancellation angle" is an angle at which one or more downward directed propulsors are oriented about the vertical axis to reduce and/or eliminate a yaw torque. As used in this disclosure a "yaw torque" is a torque exerted along the vertical axis of an aircraft, wherein the vertical axis has its origin at the center of gravity and is directed towards the bottom of the aircraft, perpendicular to the wings and to the fuselage reference line. As a non-limiting example a yaw torque directing the nose of an aircraft to the right of the vertical axis may be generated due to a rudder movement and/or shifting.

In an embodiment, and still referring to FIG. 1, yaw-torque-cancellation angle may include a nominal angle. As used in this disclosure a "nominal angle" is an angle of the propulsor in a horizontal axis. For example, and without limitation, a nominal angle may include a 3° angle tilted forward and/or a 3° angle tilted backward. Additionally or alternatively, yaw-torque-cancellation angle may include a canted angle. As used in this disclosure a "canted angle" is an angle of the propulsor in longitudinal direction. For example, and without limitation, a nominal angle may include a 5.5° angle tilted inward and/or a 5.5° angle tilted outward. In an embodiment, and without limitation, the plurality of downward directed propulsors 112 may be attached to fuselage 104 at a yaw-torque-cancellation angle that is a fixed angle. As used in this disclosure a "fixed angle" is an angle that is secured and/or unmovable from the attachment point. For example, and without limitation, a fixed angle may be an angle of 3.4° inward and/or 5.2° forward. As a further non-limiting example, a fixed angle may be an angle of 3 inward and/or 0.6° forward. In an embodiment the fixed angle may include the respective yaw-cancellation. For example, and without limitation, plurality of downward directed propulsor 112 may include a first downward directed propulsor having a first yaw-torque-cancellation angle with respect to the vertical axis and a second downward directed propulsor having a second yaw-cancelation angle with respect to the vertical axis. Additionally or alternatively, a first downward directed propulsor may be moveable to the yaw-torque-cancellation angle as a function of an actuator, wherein an actuator is described in detail below. For example, and without limitation a first downward directed propulsor may be angled at a first angle, wherein an actuator may rotate and/or shift the first downward directed propulsor to a yaw-torque-cancellation angle.

In an embodiment, and still referring to FIG. 1, yaw-torque-cancellation angle may be implemented by moving a flight component of the plurality of flight components due to a failure event, wherein a failure event is described in detail below. For example, and without limitation, yaw-torque-cancellation angle may include a shift, rotation, slider, switch, angular difference, and the like thereof for a downward directed propulsor. As a non-limiting example, yaw-torque-cancellation angle may include shifting a rudder from a +2° angle about a vertical axis to a −6° angle about the vertical axis. As a further non-limiting example, a yaw-torque-cancellation angle may include rotating a tail rotor at a speed of 1944 RPMs to rotate the nose of the plane toward 8° to the right of a vertical axis in the yaw direction. As a further non-limiting example, yaw-torque-cancellation angle may include lifting an aileron from a closed state to an open state.

In an embodiment, and still referring to FIG. 1, aircraft 100 may include at least an actuator configured to move each propulsor of the plurality of downward directed propulsors 112. As used in this disclosure an "actuator" is a motor that may adjust an angle and/or position of a the downward directed propulsors. For example, and without limitation an actuator may adjust rotor 4° in the horizontal axis. As a further non, limiting example, an actuator may adjust an a propulsor from a first vertically aligned angle to a yaw-torque-cancellation angle. For example, downward directed propulsor 112 may be attached to fuselage 104 at a first vertical axis, wherein the first vertical axis may include a 3° inward and/or 1.4° forward wherein an actuator motor may maneuver and/or shift the downward directed propulsor +/−15° in the horizontal and/or longitudinal axis. In an embodiment, and without limitation, actuator may be commanded as a function of a flight controller. As used in this disclosure a "flight controller" is a computing device of a plurality of computing devices dedicated to data storage, security, distribution of traffic for load balancing, and flight instruction. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control the aircraft remotely, and/or may include an element installed in the aircraft and a remote element in communication therewith.

In an embodiment, and still referring to FIG. 1, flight controller may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 1, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 1, flight controller may include, but is not limited to, for example, a cluster of computing devices in a first location and a second computing device or cluster of computing devices in a second location. Flight controller may include one or more computing devices dedicated to data storage, security, distribution of traffic for load balancing, and the like. Flight controller may be configured to distribute one or more computing tasks as described below across a plurality of computing devices of computing device, which may operate in parallel, in series, redundantly, or in any other manner used for distribution of tasks or memory between computing devices. Flight controller may also be implemented using a "shared nothing" architecture in which data is cached at the worker, in an embodiment, this may enable scalability of aircraft 100 and/or computing device.

In an embodiment, and with continued reference to FIG. 1, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, flight controller may be communicatively connected to a sensor. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like.

With continued reference to FIG. 1, a "sensor", as used herein, is a device, module, and/or subsystem, utilizing any hardware, software, and/or any combination thereof to detect events and/or changes in the instant environment and transmit the information. Sensor may be attached via a mechanically and/or communicatively coupled, as described above, to aircraft 100. Sensor may be configured to detect a failure event of downward directed propulsor 112. Sensor may be communicatively connected to an energy source and/or motor, wherein sensor detects one or more conditions of the energy source and/or motor. One or more conditions may include, without limitation, voltage levels, electromotive force, current levels, temperature, current speed of rotation, and the like. Sensor may further include detecting electrical parameters. Electrical parameters may include, without limitation, voltage, current, ohmic resistance of a flight component. Sensor may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor may include at least a geospatial sensor. Sensor may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 1, sensor may detect a failure event of downward directed propulsor 112 of the plurality of downward directed propulsors. As used in this disclosure a "failure event" is a failure of downward directed propulsor 112 of the plurality of downward directed propulsors. In an embodiment and without limitation, failure event 104 may include rotation degradation. As used in this disclosure "rotation degradation" is a reduced function of downward directed propulsor 112 such that a loss of control in the yaw axis occurs. As a non-limiting example, rotation degradation may occur due to a rotor in a quadrotor configuration that is not operating at the capacity necessary to maintain the flight plan, wherein the yaw portion of the torque exerted by the remaining rotors is not eliminated and an uncontrollable yaw axis torque is exerted. In a further embodiment and without limitation, failure event may include a propulsor that is not generating enough torque to maintain the flight plan. Sensor is further configured to generate a failure datum associated to the plurality of downward directed propulsors as a function of failure event. As used in this disclosure a "failure datum" is an element of data describing the failure of the downward directed propulsor, that has occurred. As a non-limiting example, failure datum may be generated as a function of the determination that a propulsor, such as a rotor, is not generating torque, and/or that propulsor and/or rotor is generating less torque than expected and/or necessary to produce a level of thrust required to maintain airspeed and/or lift. As a further example, a degree of torque may be sensed, without limitation, utilizing load sensors deployed at and/or around a propulsor and/or by measuring back electromotive force (back EMF) generated by a motor driving the propulsor. Additionally or alternatively, failure datum may be generated as a function of the determination that one or more power sources is losing capacity to provide sufficient power to downward directed propulsor 112; this may be determined based on any suitable measure of an energy source capacity and/or output. For instance and without limitation, this may be detected by detection that one or more other downward directed propulsors are consuming less power is being provided to one or more components.

Still referring to FIG. 1, failure datum may be generated as a function of determining a failure event description. As used in this disclosure a "failure event description" is a description of the failure event that identifies a plurality of downward directed propulsors associated with a failure event. As a non-limiting example, failure event description may include identifying a rotor, propulsor, energy source, and the like thereof as a function of a failure event associated with reduced output. Failure datum may be generated as a function of the determination that plurality of downward directed propulsors 112 such as systems for directional control, wherein systems for directional control include systems that enable an aircraft to maintain a heading, direct itself in a direction as indicated by a flight plan, and/or modify direction to perform one or more flight maneuvers as described above, is unable to function correctly. For instance, where steering is directed using rudders and/or ailerons, failure may include one or more rudders and/or ailerons are failing to move as required to effect steering commands; detection may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Detection may include detection of motion and/or lack thereof of a component such as an aileron and/or rudder using sensor that can detect motion. Detection of directional control failure, whether regulated by ailerons, rudders, and/or differential use of propulsors, may include a determination that expected shear stresses on the aircraft and/or one or more components thereof, as detected using load sensors, are less than they would be if the components were functioning correctly. Alternatively or additionally, detection may include detection that the aircraft is deviating from a route that would be expected if the steering components were functioning correctly.

Still referring to FIG. 1, failure datum may be generated as a function of the determination that one or more power sources is losing capacity to provide sufficient power to downward directed propulsor 112; this may be determined based on any suitable measure of an energy source capacity and/or output. For instance, and without limitation, an output voltage of the energy source may reduce and/or collapse below a threshold level, a current output may reduce below a threshold level, and/or a detected internal resistance may increase unexpectedly. This may alternatively or additionally be detected by detection that one or more other downward directed propulsors are consuming less power and/or producing less thrust, torque, force, or the like, which may indicate that less power is being provided to one or more components. Sensor is further configured to generate a failure datum of the flight component of an aircraft as a function of the failure event. Failure datum may include, as an example and without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift. As a further example a degree of torque may be sensed, without limitation, using load sensors deployed at and/or around a propulsor and/or by measuring back electromotive force (back EMF) generated by a motor driving the propulsor.

In an embodiment, and still referring to FIG. 1, flight controller may be configured to receive failure datum from the sensor associated with downward directed propulsor 112 and determine a corrective action for a flight component of the plurality of flight components as a function of the failure datum. As used in this disclosure a "corrective action" is an action conducted by the plurality of flight components to correct and/or alter a movement of an aircraft, wherein a flight component is a component that promotes flight and guidance of an aircraft as described below in detail. Corrective action may be determined as a function of reducing yaw torque generated by the downward directed propulsor. As used in this disclosure "yaw torque" is a torque exerted around the yaw axis of an aircraft. As a non-limiting example a yaw torque directing the nose of an aircraft to the right of a vertical axis may be generated due to a rudder movement and/or shifting. As used in this disclosure a "flight component" is a portion of an aircraft that can be moved or adjusted to affect altitude, airspeed velocity, groundspeed velocity or direction during flight. In an embodiment, flight controller may be communicatively coupled to the plurality of flight components. For example, plurality of flight components may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, the plurality of flight components may include a rudder, which may include, without limitation, a segmented rudder. The rudder may function, without limitation, to control yaw of an aircraft. The rudder may allow the aircraft to change in the horizontal direction, without altering the vertical direction. In an embodiment the rudder may include a rudder travel limiter. As used in this disclosure a "rudder travel limiter" is a maximum limit the rudder may be deflected. For example, a rudder may be limited to an angle of no more than 30°. Additionally or alternatively, the plurality of flight components may include other flight control surfaces such as propulsors, rotating flight controls, or any other structural features which can adjust the movement of the aircraft. In an embodiment, plurality of flight components may be oriented at a flight angle. As used in this disclosure a "flight angle" is an angle of the flight components to allow for flight capabilities. For example, and without limitation flight angle may be 7° for a first rotor, wherein the flight angle for a second rotor may be 7°.

Still referring to FIG. 1, plurality of flight components may include a tail rotor. As used in this disclosure a "tail rotor" is a smaller rotor mounted vertically and/or near-vertically at the tail of the aircraft. Tail rotor may rotate to generate a yaw thrust in the same direction as the main rotor's rotation. Tail rotor may be positioned at a distance from the aircrafts center of mass to allow for enough thrust and/or torque to rotate the aircraft in the yaw direction. Tail rotor may include an adjustable pitch. As used in this disclosure an "adjustable pitch" is a pitch of the tail rotor blades that may be varied to provide directional control of the tail rotor in the yaw axis. For example, and without limitation, the tail rotor may rotate an aircraft 3° in the positive direction of the yaw axis to maintain a flight path. In an embodiment, and without limitation, the tail rotor may be composed of a core made of aluminum honeycomb and/or plasticized paper honeycomb, covered in a skin made of aluminum, carbon fiber composite, and/or titanium. Tail rotor may be fixed and/or adjustable as a function of an actuator motor.

Still referring to FIG. 1, plurality of flight components may include a NOTAR. As used in this disclosure a "NOTAR" is a rotor that has no rotating parts in the open.

The NOTAR may include an air intake located just behind the main cabin of the aircraft. The air intake may then be thrust towards the tail boom of the aircraft as a function of a NOTAR fan that blows compressed air through the tail boom. The NOTAR fan may be variably controlled to adjust the amount of air that is forced to the end of the tail boom in the aircraft. The compressed air that NOTAR may generate may an exhaust force out of a side of the tail boom. As used in this disclosure an "exhaust force" is a force that is expelled to provide directional control of the aircraft in the yaw axis. For example, and without limitation a NOTAR may expel an exhaust force out of the left side of the tail boom, wherein the tail boom moves in the yaw axis to the right, adjusting the nose of the aircraft to the left.

Still referring to FIG. 1, corrective action may be determined as a function of receiving a vertically aligned angle as a function of the sensors. As used in this disclosure a "vertically aligned angle" is a measurement of at least a force that share a common endpoint. Vertically aligned angle may include a measurement of a force in reference to a vertical axis, such as without limitation a vertical axis matching a vertical axis of the aircraft when at rest on the ground. Vertically aligned angle may be determined as a function of obtaining a yaw input. As used in this disclosure a "yaw input" is any input and/or datum that identifies a vertically aligned angle. For example, and without limitation, yaw input may be obtained as a function of a yaw detector. As used in this disclosure a "yaw detector" is one or more sensors that are capable of determining a vertically aligned angle, yaw velocity, and/or yaw acceleration. Yaw detector may measure the ground velocity at two geometrically separated points on the body of the aircraft. In an embodiment and without limitation, the yaw detector may include a gyroscope. As used in this disclosure a "gyroscope" is a detector that may measure orientation and/or angular velocity. For example, and without limitation, gyroscopes may include microchip-packaged MEMS gyroscopes, gyrometers, solid-state ring lasers, fiber optic gyroscopes, quantum gyroscopes, inertial navigation systems, gyrocompasses, and the like thereof. Additionally or alternatively, yaw detector may include a haltere component. As used in this disclosure a "haltere component" is a vibrating gyroscope that extends from the aircraft along the yaw axis. In an embodiment, and without limitation, haltere component may rapidly oscillate along the extensions to detect any rotation of the plane of oscillation as a function of a Coriolis effect. As used in this disclosure a "Coriolis effect" is an inertial and/or fictitious force that acts on objects that are in motion within a frame of reference that rotates with respect to an inertial frame. For example, and without limitation, one or more haltere components may determine a yaw axis direction as a function of the vibrating gyroscopes and the aircrafts yaw velocity.

In an embodiment, and still referring to FIG. 1, yaw detector may include an accelerometer. As used in this disclosure an "accelerometer" is a detector that measures proper acceleration. Accelerometers may measure proper acceleration as a function of measuring motion and/or vibration by converting physical movement into an electrical signal suitable for measurement, recording, analysis, and/or control. For example, and without limitation, accelerometers may exhibit a flat amplitude sensitivity and phase response with respect to frequency, and straight-line amplitude. As a further non-limiting example, accelerometers may include one or more inertial mass deflecting component, such as a beam and/or crystal, and/or an inertial sensing element. In an embodiment, and without limitation, accelerometers may measure proper acceleration of the aircraft and synthesis the yaw velocity as a function of the measured lateral acceleration of the aircraft at constant speed around a constant radius.

Still referring to FIG. 1, corrective action may identify a yaw-torque-cancellation angle as a function of the vertically aligned angle. A yaw-torque-cancellation angle may be implemented by a movement of a flight component of the plurality of flight components due to a failure event. For example, and without limitation, yaw-torque-cancellation angle may include a shift, rotation, slider, switch, angular difference, and the like thereof for a downward directed propulsor. As a non-limiting example, yaw-torque-cancellation angle may include shifting a rudder from a +2° angle about a vertical axis to a −6° angle about the vertical axis. As a further non-limiting example, a yaw-torque-cancellation angle may include rotating a tail rotor at a speed of 1944 RPMs to rotate the nose of the plane toward 8° to the right of a vertical axis in the yaw direction. As a further non-limiting example, yaw-torque-cancellation angle may include lifting an aileron from a closed state to an open state. Yaw-torque-cancellation angle may be identified as a function of receiving a yaw torque as a function of failure datum. Yaw-torque-cancellation angle may be implemented by operating a nullification element as a function of the yaw torque. As used in this disclosure a "nullification element" is an element that eliminates a yaw torque, such that a net zero yaw torque is exerted on the aircraft. As a non-limiting example a nullification element may include forcing compressed air through a NOTAR to move the tail of the aircraft to a 12° angle off the vertical axis to correct a flight component failure such that the net yaw torque is zero. In an embodiment, and without limitation, yaw-torque-cancellation angle may be identified as a function of one or more external factors, wherein external factors include air speed, flight component movements, such as revolutions per minute, weather, altitude, and the like thereof.

In an embodiment and still referring to FIG. 1, identifying yaw-torque-cancellation angle may include identifying a corrective tilt. As used in this disclosure a "corrective tilt" is an angle and/or movement required to at least reduce and/or eliminate a yaw torque exerted on the aircraft. Corrective tilt may be moved and/or rotated as a function of a vertical axis that is perpendicular to the flight component. As a non-limiting example a corrective tilt may include rotating and/or shifting a rotor of a quadrotor configuration 3° towards the vertical axis to reduce the yaw torques exerted by the remaining three rotors. In an embodiment, and without limitation, corrective tilt may be identified as a function of one or more external factors, wherein external factors include air speed, flight component movements, such as revolutions per minute, weather, altitude, and the like thereof.

Still referring to FIG. 1, flight controller may command an actuator to perform corrective action. As a non-limiting example, commanding an actuator may include vectoring a longitudinal thrust flight component of the plurality of longitudinal thrust flight components. As used in this disclosure "vectoring" is a manipulation and/or alteration of the direction of thrust and/or action of a flight component. As a non-limiting example, vectoring a longitudinal thrust flight component may include shifting and/or rotating a propulsor to alter and/or change the direction of thrust generated by the propulsor. As a further non-limiting example, vectoring a longitudinal thrust flight component may include increasing and/or decreasing total power supplied to a propulsor to alter and/or change the force of thrust generated by the propulsor.

As used in this disclosure a "longitudinal thrust flight component" is a flight component that is mounted such that the component thrusts the flight component through a medium. As a non-limiting example, longitudinal thrust flight component may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

In an embodiment, and still referring to FIG. 1, performing corrective action may include vectoring a torque component of the plurality of torque components. As used in this disclosure a "torque component" is a component that generates a rotational torque and/or turning effect. For example, and without limitation a tail rotor may be a torque component, wherein a tail rotor may be capable of exerting a rotational torque on the aircraft about a vertical axis in the yaw direction. As a further non-limiting example, a torque component may include rudder, wherein a rudder may be shifted to at least exert a rotational torque on the aircraft about aircraft about a vertical axis in the yaw direction. In an embodiment, and without limitation a torque component may include a gyroscopic stabilizer. As used in this disclosure a "gyroscopic stabilizer" is a stabilizer that reduces the yaw torque of an aircraft. For example, and without limitation gyroscopic stabilizer may sense yaw torque as a function of a first sensing gyroscope, wherein a gyroscope is a detector that may measure orientation and/or angular velocity, as described above in detail, and counteract yaw torque as a function of adjusting control surfaces and/or applying torque to a second larger gyroscope, wherein the second large gyroscope may exert a corrective action on the aircraft.

With continued reference to FIG. 1, aircraft 100 may include an electric aircraft that flight controller may be programmed to operate an aircraft, including without limitation an electronic aircraft, to perform at a flight maneuver. A flight maneuver may include taxiing, takeoff, landing, stability control maneuvers, hovering, emergency response maneuvers, regulation of altitude, roll, pitch, yaw, speed, acceleration, or the like during any phase of flight. A flight maneuver may further include a flight plan or sequence of maneuvers to be performed during a flight plan. A flight maneuver can also include a change in altitude, change in speed, changed in travel direction, or the like. Further, a flight maneuver may include a landing, which may be a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons. Momentum may be exhausted more rapidly by reverse thrust using propulsors, mechanical braking, electric braking, or the like. In an embodiment, a flight maneuver may include a vertical landing protocol, which may include a rotor-based landing such as one performed by rotorcraft such as helicopters or the like. In an embodiment, vertical takeoff and landing protocols may require greater expenditure of energy than runway-based landings. For example, vertical takeoff and landing protocols may, for instance, require substantial expenditure of energy to maintain a hover or near hover while descending or ascending, while the latter may require a net decrease in energy to approach or achieve stall. In an embodiment, flight controller may be designed and configured to operate an aircraft via fly-by-wire. Flight controller may enable fly-by-wire in response to an event or by the actions of others. In an embodiment, flight controller may command an aircraft to operate via fly-by-wire when a failure of a component is detected.

Figure 2:
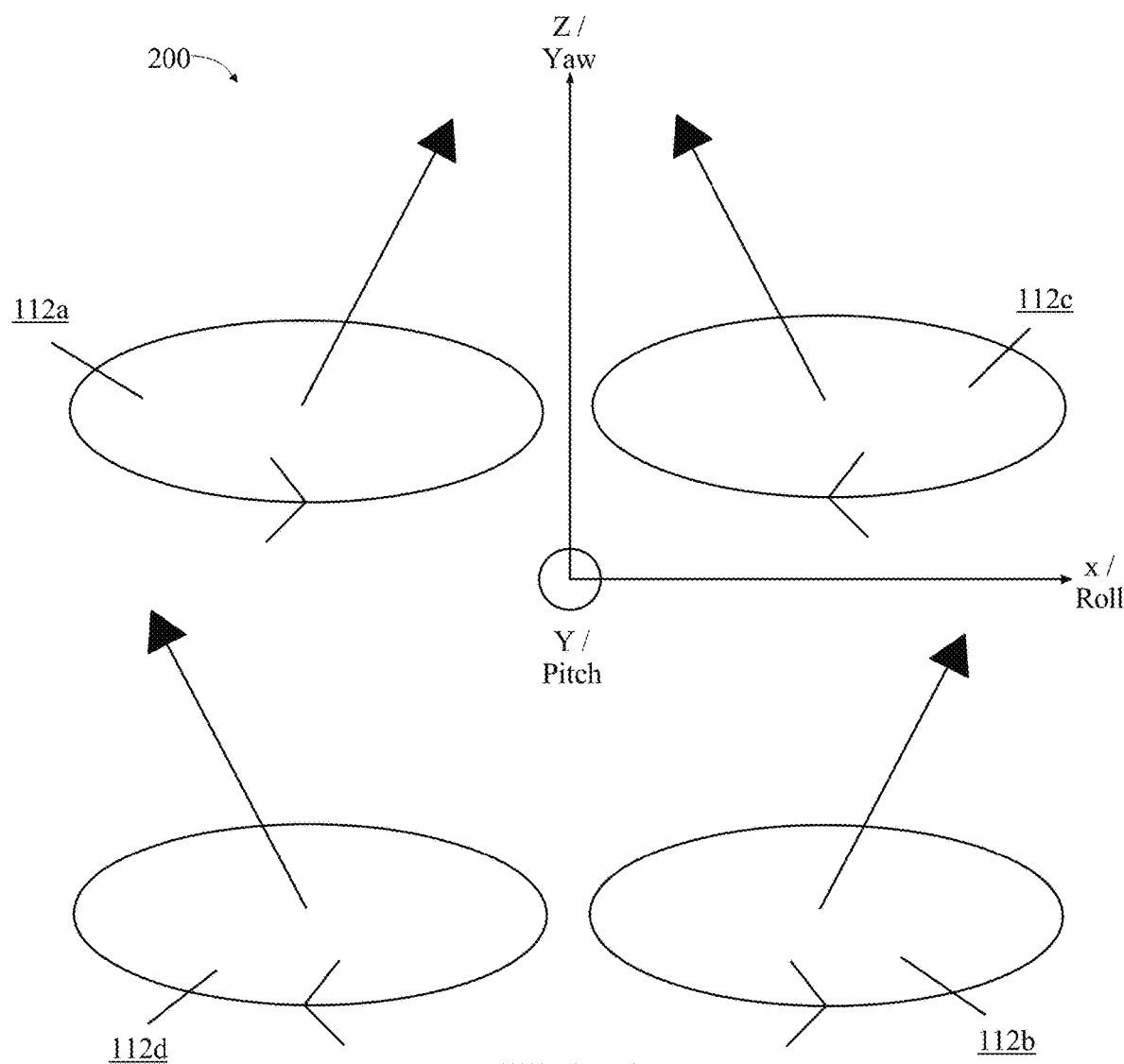
FIG. 2 is a diagrammatic representation of an exemplary embodiment of a yaw-torque-cancellation angle.

Now referring to FIG. 2, an embodiment of yaw-torque-cancellation angle 200 is displayed. A plurality of flight components 112*a-d* attached to an aircraft includes a first downward directed propulsor 112*a* and second downward directed propulsor 112*b* are rotating in a counter-clockwise direction. First downward directed propulsor 112*a* and second downward directed propulsor 112*b* are attached at a yaw-torque-cancellation angle to produce a yaw contribution along the roll axis in a positive direction. First downward directed propulsor 112*a* may include any first downward directed propulsor as described above in the entirety of this disclosure. Second downward directed propulsor 112*b* may include any second downward directed propulsor as described above in further detail. Further, in the embodiment, third downward directed propulsor 112*c* and fourth downward directed propulsor 112*d* are rotating in a clockwise direction. Third downward directed propulsor 112*c* and fourth downward directed propulsor 112*d* are attached at a yaw-torque-cancellation angle to produce yaw contribution along the roll axis in a negative direction. Third downward directed propulsor 112*c* may include any third downward directed propulsor as described above in further detail. Fourth downward directed propulsor 112*d* may include any fourth downward directed propulsor as described above in further detail in the entirety of this disclosure. In the embodiment, to control yaw of the aircraft, third downward directed propulsor 112*c* and fourth downward directed propulsor 104*d* to spin on the diagonal, such that pitch or roll torque is not coupled with yaw. Moreover, the sum of yaw contribution is negated as each rotor cancels the opposing yaw contributions of the subsequent rotors.

Figure 3:
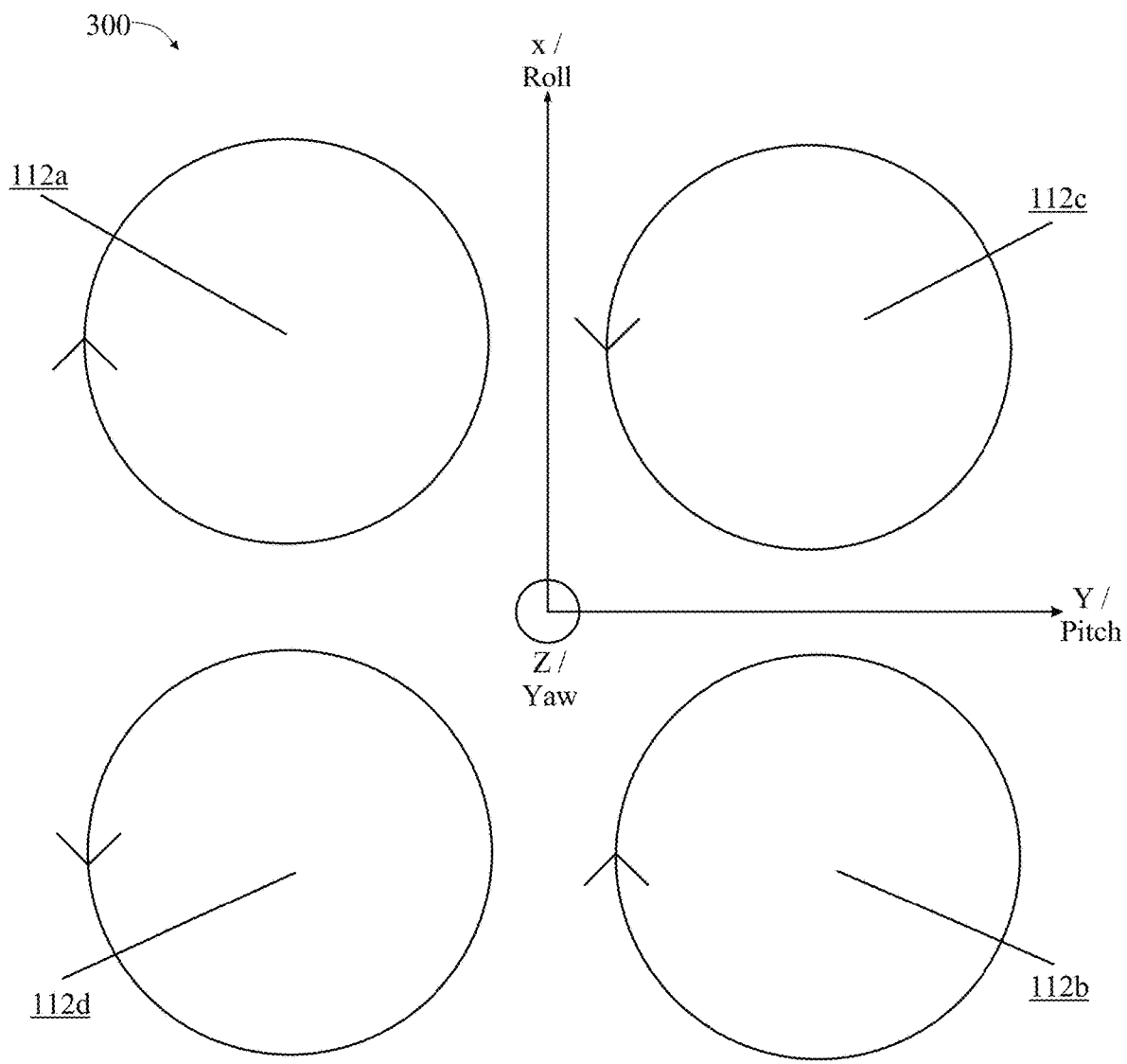
FIG. 3 is a diagrammatic representation of an exemplary embodiment of self-neutralizing flight.

Referring now to FIG. 3, an embodiment 300 for self-neutralizing flight is displayed. A plurality of downward directed propulsors 112*a-d* attached to an aircraft includes a first downward directed propulsor 112*a* and second downward directed propulsor 112*b* that are rotating in a counter-clockwise direction. First downward directed propulsor 112*a* may include any first downward directed propulsor as described above in the entirety of this disclosure. Second downward directed propulsor 112*b* may include any second downward directed propulsor as described above in further detail. Further, in the embodiment, third downward directed propulsor 112*c* and fourth downward directed propulsor 112*d* are rotating in a clockwise direction. Third downward directed propulsor 112*c* may include any third downward directed propulsor as described above in further detail. Fourth downward directed propulsor 112*d* may include any fourth downward directed propulsor as described above in further detail in the entirety of this disclosure. In the embodiment, the sum of motor torques and thrust torques produced by first downward directed propulsor 112*a*, second downward directed propulsor 112*b*, third downward directed propulsor 112*c*, and fourth downward directed propulsor 112*d* provide the aircraft with roll, and pitch control. Further, in the embodiment, the sum of thrusts generated by first downward directed propulsor 112*a*, second downward directed propulsor 112*b*, third downward directed propulsor 112*c*, and fourth downward directed propulsor 112*d* provides the aircraft with heave, such as altitude control. In the embodiment, to control yaw of the aircraft, third downward directed propulsor 112c and fourth downward directed propulsor 112d to spin on the diagonal, such that pitch or roll torque is not coupled with yaw.

Figure 4:
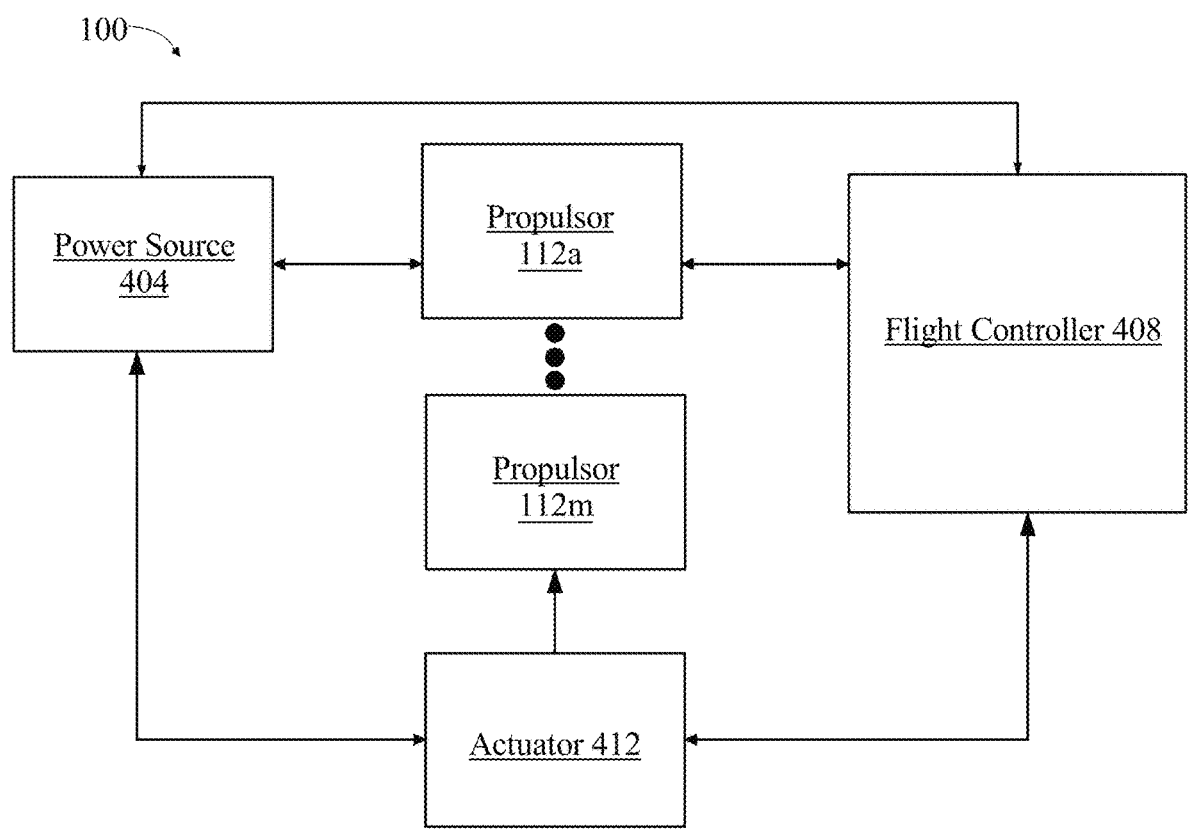
FIG. 4 a block diagram illustrating an exemplary embodiment of an aircraft for self-neutralizing flight.

Referring now to FIG. 4, a block diagram of an exemplary embodiment of an aircraft for self-neutralizing flight 100 is illustrated. Aircraft 100 includes a power source 404, wherein a power source is a source that may propel a rotor, or set of airfoils, through a fluid medium, like air, generating life. As described above in detail. Power source 404 provides power to a plurality of downward directed propulsors 112a-m. Downward directed propulsor 112a-m includes any of the downward directed propulsor 112 as described above, in reference to FIGS. 1-3. The plurality of downward directed propulsors 112a-m may be controlled by a flight controller 408, wherein flight controller 408 is a computing device of a plurality of computing devices dedicated to data storage, security, distribution of traffic for load balancing, and flight instruction as described above in detail in reference to FIGS. 1-3. In an embodiment, and without limitation. flight controller 408 may receive power from power source 404. For example, and without limitation, flight controller 408 may include one or more flight management systems, control display units, electronic flight instrument systems, flight management computers, and the like thereof. Flight controller 408 may comment the plurality of downward directed propulsors 112a-m to rotate at a specific power, torque, speed, velocity, and the like thereof. Flight controller 408 may command plurality of downward directed propulsors 112a-m to accelerate and/or decelerate as a function of one or more flight paths. Additionally or alternatively, flight controller 408 may command an actuator 412, wherein an actuator 412 is a motor that may adjust an angle and/or position of a the downward directed propulsors as described above, in reference to FIGS. 1-3. In an embodiment, and without limitation, actuator 412 may receive power from power source 404. Actuator may rotate, shift, maneuver, and/or adjust the plurality of downward directed propulsors 112a-m as a function of flight controller 408. For example, and without limitation flight controller 408 may command actuator to rotate 6° in the horizontal axis, wherein actuator may then adjust the plurality of downward directed propulsors 112a-m to rotate according to the movement of the actuator. As a further non-limiting example, flight controller 408 may command actuator to rotate 6° in the horizontal axis, wherein actuator may then adjust the plurality of downward directed propulsors 112a-m to rotate according to the movement of the actuator.

Figure 5:
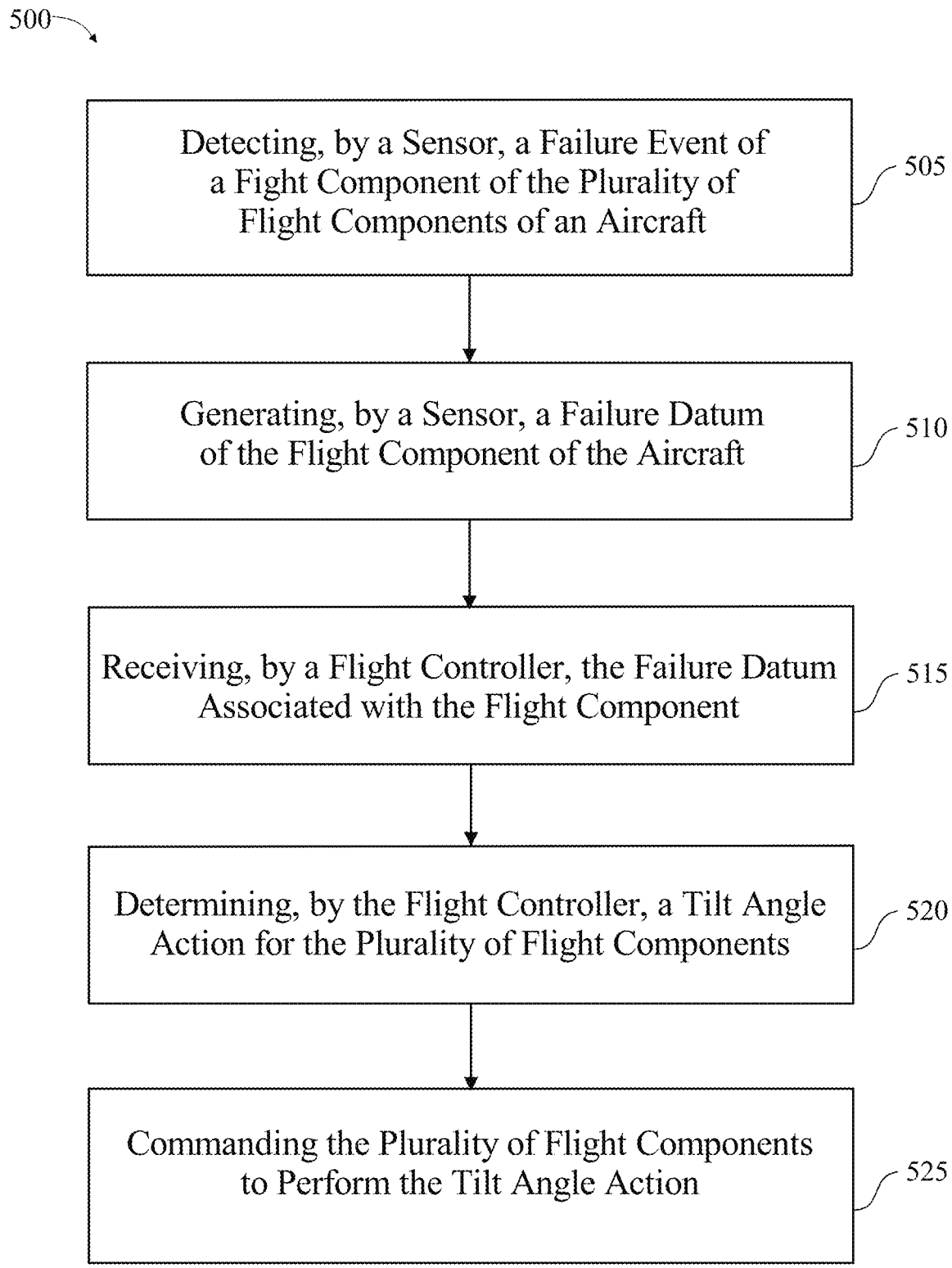
FIG. 5 is a flow diagram illustrating an exemplary embodiment for a method of an aircraft for self-neutralizing flight.

Now referring to FIG. 5, an exemplary embodiment for a method for in-flight yaw stabilization is illustrated. At step 505, a sensor detects a failure event of a downward directed propulsor 112 of a plurality of downward directed propulsors. Sensor includes any of the sensor as described above, in reference to FIGS. 1-4. Failure event includes any of the failure event as described above, in reference to FIGS. 1-4. Plurality of downward directed propulsors 112 includes any of the plurality of downward directed propulsors 112 as described above, in reference to FIGS. 1-4.

Still referring to FIG. 5, at step 510, sensor generates a failure datum associated to the plurality of downward directed propulsors 112. Failure datum includes any of the failure datum as described above, in reference to FIGS. 1-4.

Still referring to FIG. 5, at step 515, a flight controller receives failure datum associated with the plurality of downward directed propulsors from sensor. Flight controller includes any of the flight controller as described above, in reference to FIGS. 1-4.

Still referring to FIG. 5, at step 520, flight controller determines a corrective action from a plurality of flight components and/or downward directed propulsor 112 as a function of failure datum. Corrective action includes any of the corrective action as described above, in reference to FIGS. 1-4. Plurality of flight components includes any of the plurality of flight components as described above, in reference to FIGS. 1-4.

Still referring to FIG. 5, at step 525, flight controller commands an actuator to perform corrective action on the plurality of flight components and/or downward directed propulsors 112. Actuator includes any of the actuator as described above, in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
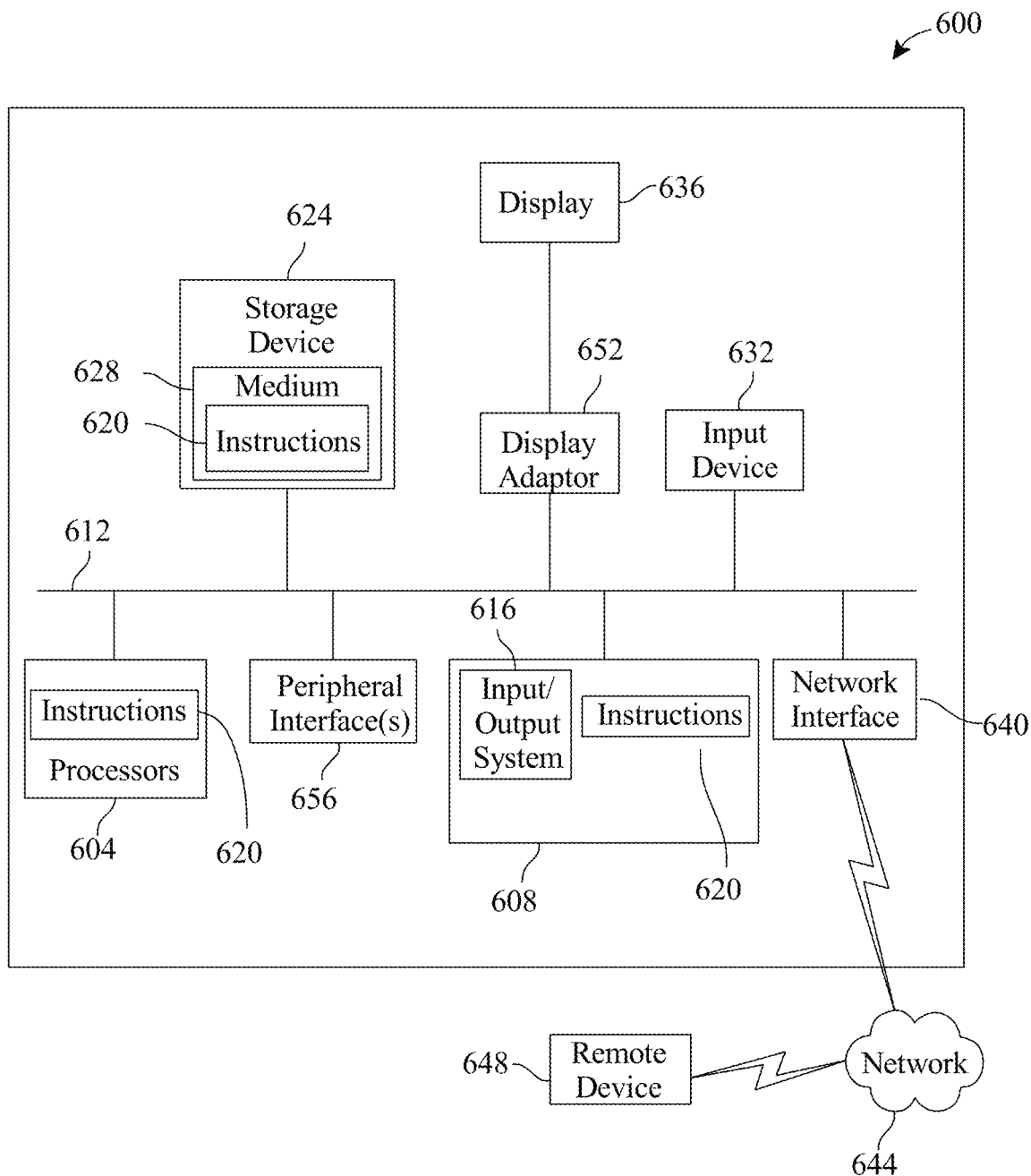
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft, the aircraft comprising:
   a fuselage;
   an adjustable tail rotor mechanically attached to a tail end of the fuselage, wherein the tail rotor is mounted substantially vertically and comprises tail rotor blades with an adjustable pitch;
   at least a power source located within the fuselage;
   a plurality of laterally extending elements attached to the fuselage, wherein the plurality of laterally extending elements extend perpendicularly to the fuselage;
   a plurality of longitudinally extending elements attached to the plurality of laterally extending elements, wherein the plurality of longitudinally extending elements extend perpendicularly to the plurality of laterally extending elements and parallel to the fuselage;
   a plurality of downward directed propulsors attached to the plurality of longitudinally extending elements and electrically connected to the at least a power source, the plurality of downward directed propulsors comprising a first downward directed propulsor and a second downward directed propulsor;
   a sensor associated with at least the first downward directed propulsor of the plurality of downward directed propulsors, wherein the sensor is configured to:
      detect a failure event of the first downward directed propulsor; and
      generate a failure datum as a function of the failure event of the first downward directed propulsor; and
   a flight controller communicatively connected to the sensor, wherein the flight controller is configured to:
      receive the failure datum from the sensor associated with the first downward directed propulsor;
      determine a corrective action as a function of the failure datum, wherein determining the corrective action comprises identifying at least one corrective tilt for shifting the second downward directed propulsor based on a yaw torque exerted on the aircraft; and
      command at least one actuator to perform the corrective tilt for shifting the second downward directed propulsor.

2. The aircraft of claim 1, wherein at least one downward directed propulsor of the plurality of downward directed propulsors is attached to the aircraft at a fixed angle.

3. The aircraft of claim 1, wherein the sensor is attached to the aircraft.

4. The aircraft of claim 1, wherein the sensor is further configured to generate the failure datum by determining a failure event description.

5. The aircraft of claim 1, wherein the flight controller is further configured to command an actuator to maneuver the first downward directed propulsor of the plurality of downward directed propulsors as a function of the corrective action.

6. The aircraft of claim 1, wherein the corrective action comprises vectoring a longitudinal thrust flight component.

7. The aircraft of claim 1, wherein the flight controller is further communicatively coupled to the plurality of downward directed propulsors.

8. The aircraft of claim 1, wherein the aircraft is an electric aircraft.

9. The aircraft of claim 1, wherein the aircraft is an electric vertical takeoff and landing (eVTOL) aircraft.

10. The aircraft of claim 1, wherein the failure event includes a rotation degradation of the first downward directed propulsor.

11. The aircraft of claim 1, wherein the corrective action includes a corrective angular tilt of at least a rotor of the plurality of downward directed propulsors relative to a vertical axis that is perpendicular to a flight component.

12. The aircraft of claim 1, wherein the flight controller is further configured to command an actuator to perform the corrective action by adjusting at least one of the plurality of downward directed propulsors to perform a corrective tilt angle action.

13. The aircraft of claim 1, wherein the sensor is further configured to generate the failure datum as a function of a determination by the sensor that the first downward directed propulsor is not generating sufficient torque.

14. The aircraft of claim 1, wherein the sensor comprises a load sensor configured to sense torque generated by the first downward directed propulsor.

15. The aircraft of claim 14, wherein the sensor is configured to measure back electromotive force (EMF) generated by a motor driving the first downward directed propulsor.

16. The aircraft of claim 1, wherein the sensor is further configured to generate the failure datum as a function of a determination by the sensor that the at least a power source is losing capacity to provide sufficient power to the first downward directed propulsor.

17. The aircraft of claim 16, wherein the at least a power source includes at least a battery, wherein the at least a battery includes a lithium ion battery.

18. The aircraft of claim 17, wherein the determination by the sensor that the at least a power source is losing capacity includes determining that a voltage output of the at least a battery is below a threshold voltage level.

19. The aircraft of claim 17, wherein the determination by the sensor that the at least a power source is losing capacity includes determining that a current output of the at least a battery is below a threshold current level.

* * * * *